(12) United States Patent
Reinfeldt

(10) Patent No.: US 11,928,258 B2
(45) Date of Patent: Mar. 12, 2024

(54) METHOD AND APPARATUS FOR IDENTIFYING AN OBJECT OF INTEREST OF A SPECIFIC PERSON BASED ON THAT PERSON'S DETECTABLE BEHAVIOR

(71) Applicant: Gestigon GmbH, Luebeck (DE)

(72) Inventor: Cornelius Reinfeldt, Luebeck (DE)

(73) Assignee: Gestigon GmbH, Luebeck (DE)

( * ) Notice: Subject to any disclaimer, the term of this patent is extended or adjusted under 35 U.S.C. 154(b) by 0 days.

(21) Appl. No.: 18/019,156

(22) PCT Filed: Jul. 28, 2021

(86) PCT No.: PCT/EP2021/071092
§ 371 (c)(1),
(2) Date: Feb. 1, 2023

(87) PCT Pub. No.: WO2022/028971
PCT Pub. Date: Feb. 10, 2022

(65) Prior Publication Data
US 2023/0280824 A1   Sep. 7, 2023

(30) Foreign Application Priority Data
Aug. 4, 2020   (DE) ...................... 10 2020 120 546.5

(51) Int. Cl.
*G06F 3/01* (2006.01)
*G06V 10/764* (2022.01)

(52) U.S. Cl.
CPC .............. *G06F 3/013* (2013.01); *G06F 3/012* (2013.01); *G06F 3/017* (2013.01); *G06V 10/764* (2022.01)

(58) Field of Classification Search
CPC .......... G06F 3/011; G06F 3/012; G06F 3/013; G06F 18/25; G06F 18/295; G06V 40/70; G06V 40/19
See application file for complete search history.

(56) References Cited

U.S. PATENT DOCUMENTS

| 9,720,510 B2 | 8/2017 | Di Censo et al. |
| 2015/0193005 A1 | 7/2015 | Di Censo et al. |

(Continued)

FOREIGN PATENT DOCUMENTS

| EP | 2802964 B1 | 4/2019 |

OTHER PUBLICATIONS

Ramage, D., Hidden Markov Models Fundamentals, Stanford University, CS229 Section Notes, Dec. 1, 2007 (http://cs229.stanford.edu/section/cs229-hmm.pdf) (13 pages).

(Continued)

*Primary Examiner* — Liliana Cerullo

(57) ABSTRACT

A method for identifying an object of interest of a person based on that person's detected behavior is disclosed. The method involves receiving or generating ambient data representing a first time sequence of ambient data items, each representing for a specific respective point in time in the first time sequence ambient targets being currently present as a respective object in the spatial environment of the person at that point in time, receiving or generating directional sensor data representing a second time sequence of directional data items, each representing directional measurements relating to a specific point in time in the second time sequence, matching the directional sensor data to the possible targets of the ambient data to generate a third time sequence of result data items, and classifying one or more of the ambient targets based on at least two of the corresponding result data items of the third time sequence.

15 Claims, 4 Drawing Sheets

(56) References Cited

U.S. PATENT DOCUMENTS

Figure 1:
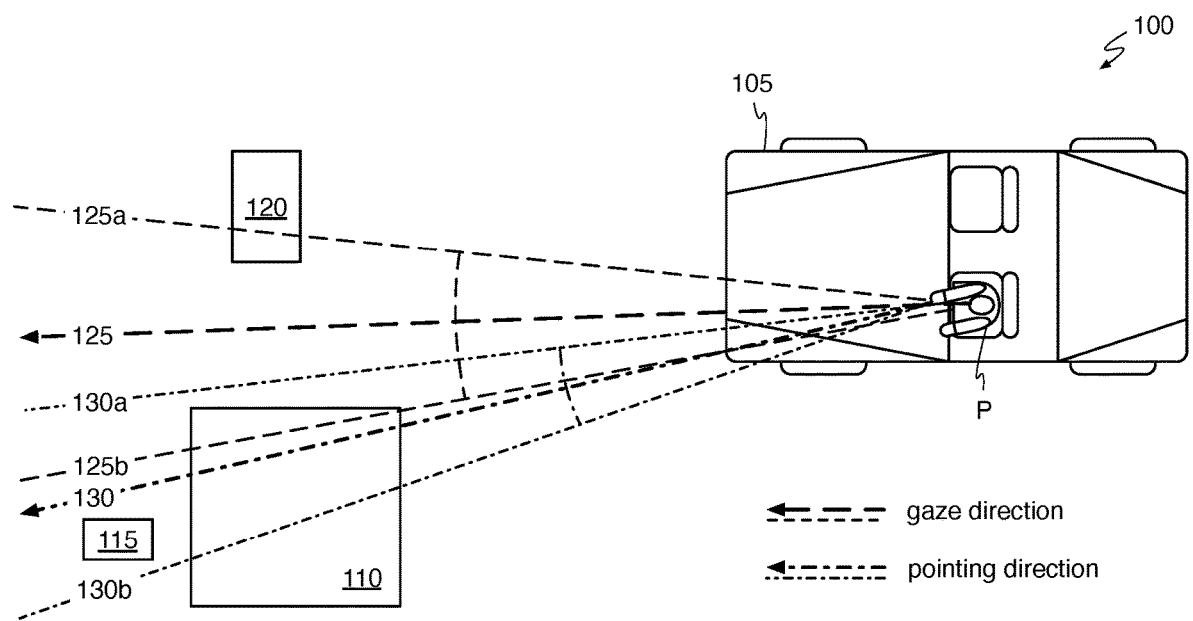

| | | |
|---|---|---|
| 2016/0026245 A1 | 1/2016 | Mantiuk et al. |
| 2018/0204111 A1* | 7/2018 | Zadeh .................. G06V 10/764 |
| 2020/0104589 A1 | 4/2020 | Sengelaub et al. |
| 2021/0104100 A1* | 4/2021 | Whitney ............... G06T 19/006 |
| 2021/0165481 A1* | 6/2021 | Brugarolas Brufau ...................... G06T 15/00 |
| 2021/0173480 A1* | 6/2021 | Osterhout ............. G06F 3/0227 |
| 2021/0370980 A1* | 12/2021 | Ramamoorthy ...... G06F 18/214 |
| 2022/0342213 A1* | 10/2022 | Lu ........................... G06F 3/012 |

OTHER PUBLICATIONS

Aftab, A.R.: Multimodal Driver Interaction with Gesture, Gaze and Speech. In: 2019 International Conference on Multimodal Interaction. 2019. S. 487-492 (6 pages).

German Search Report in corresponding German Application No. 10 2020 120 546.5, dated May 7, 2021 (8 pages).

International Search Report and Written Opinion in corresponding International Application No. PCT/EP2021/071092, dated Nov. 11, 2021 (11 pages).

\* cited by examiner

METHOD AND APPARATUS FOR IDENTIFYING AN OBJECT OF INTEREST OF A SPECIFIC PERSON BASED ON THAT PERSON'S DETECTABLE BEHAVIOR

The present invention relates to the field of human machine interfaces (HMIs). Specifically, the invention is directed to a method and an apparatus for identifying an object of interest of a specific person based on that person's detected behavior.

While classical HMIs were typically based on manual inputs by a person (user), where the manual inputs were for example provided by the person toggling a switch, pressing a button or moving a slide control, or the like, there is a large variety of modern HMIs, which are based on different principles. Touch sensitive surfaces, in particular touchscreens, and speech recognition systems are just two examples for such modern HMI types. In addition, recently HMIs were developed that are designed to detect and recognize human gestures, in particular directional gestures, and interpret such recognized gestures as user inputs.

Specifically, such gestures may be interpreted as pointing to a particular object of interest of a specific person performing the gesture (i.e. a user of the HMI), thereby selecting that object. While for classical HMIs the detection and classification of a user input is typically trivial, because toggling a switch or pressing a button can typically be detected very reliably and there is a predefined fixed interpretation of the meaning of such a user input, reliably detecting and recognizing a particular behavior of a human user, such as a gesture being performed to provide a user input, is typically a non-trivial and much more complex task. On the other hand, in many applications, an HMI will typically have to have a very high level of reliability regarding a correct determination of a user input in order for the HMI to be acceptable or even useful, e.g. in automotive applications or in other technical environments, such as medical operation rooms.

Therefore, it is an object of the present invention to provide a robust and statistically reliable approach for identifying an object of interest of a person based on that person's detected behavior.

A solution to this problem is provided by the teaching of the independent claims. Various preferred embodiments of the present invention are provided by the teachings of the dependent claims.

A first aspect of the invention is directed to a method of identifying an object of interest of a person based on that person's detectable behavior. The method, which may in particular be a computer-implemented method, comprises: (i) Receiving or generating ambient data representing a first time sequence of ambient data items, each ambient data item representing for a specific respective point in time in the first time sequence one or more ambient targets being currently present as a respective object in the spatial environment of the person at that point in time; (ii) Receiving or generating directional sensor data representing a second time sequence of directional data items, each directional data item representing one or more directional measurements relating to a specific point in time in the second time sequence, wherein each of the directional measurements indicates a detected directional aspect of the person's behavior at that point in time; (iii) Matching the directional sensor data to the possible targets represented by the ambient data to generate a third time sequence of result data items, each result data item representing a matching result indicating whether a directional data item in the directional sensor data indicates a direction pointing to a ambient target being represented by a temporally corresponding ambient data item in the ambient data; and (iv) Classifying one or more of the ambient targets represented by the ambient data based on at least two of the corresponding result data items of the third time sequence to determine which of these ambient targets, if any, is being focused by the person. Therein, the matching is based on a sensor fusion model configured to determine the most likely focus target in dependence on measurements represented by the first and second time sequences.

The term "object of interest of a person", as used herein, refers to any specific object that is visible to the person and which that person selects by its detectable behavior as an object of interest. For example and without limitation, such an object may be a physical object such as building, a sign, a vehicle, or another person, animal or plant, or a virtual object in a augmented reality or virtual reality setting. Those objects, which are at a given point in time in the field of sight of the person are referred to as the "ambient targets" or in short "targets" at that point in time. Accordingly, an object of interest of a person is a particular target which has been recognized as being selected by the person by a specific detectable behavior.

The term "a person's detectable behavior", as used herein, refers to a behavior of that person, as expressed for example by means of gestures or eye gaze or speech or other sounds, which can be detected by means of one or more sensors and which reflects an indication of direction expressed by the person by means of such behavior.

A directional data item in the directional sensor data is referred to as "temporally corresponding" to a respective ambient data item in the ambient data, when there is an overlap in time or other temporal connection between on the one hand the time period spanning a directional measurement for determining the directional data item and on the other hand a time period during which the one or more ambient targets represented by the ambient data item are in the field of sight of the person. Accordingly, the directional data item and its corresponding ambient data item do not necessarily have to relate to an exact same point in time, although such a coincidence is also possible.

The term "sensor fusion model", as used herein, refers to a model for combining sensory data or data derived from disparate sources such that the resulting information has less uncertainty than would be possible when these sources were used individually. The term uncertainty reduction in this case can mean more accurate, more complete, or more dependable, or refer to the result of an emerging view, such as stereoscopic vision (calculation of depth information by combining two-dimensional images from two cameras at slightly different viewpoints).

As used herein, the terms "comprises", "comprising," "includes," "including," "has," "having" or any other variation thereof, are intended to cover a non-exclusive inclusion. For example, a process, method, or apparatus that comprises a list of elements is not necessarily limited to only those elements but may include other elements not expressly listed or inherent to such process, method, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

The terms "a" or "an," as used herein, are defined as one or more than one. The term "plurality," as used herein, is defined as two or more than two. The term "another," as used herein, is defined as at least a second or more.

The method of the first aspect enables in particular an incorporation of any kind of directional measurements into the process for identification of the object of interest by means of a sensor fusion model that determines the most likely focus target as said object of interest based on the history of given directional sensor data and ambient data. This yields a robust and statistically accurate and reliable approach for identifying an object of interest of a specific person based on measurement data of the person's behavior, such as, for example, pointing gestures and eye gaze.

In the following, preferred embodiments of the invention, in particular of the mentioned method, are described, which embodiments can be arbitrarily combined with each other or with other aspects of the present invention, unless such combination is explicitly excluded or technically impossible.

In some embodiments, the matching is based on a sensor fusion model comprising a Hidden Markov Model, HMM, which comprises: (i) a hidden state space comprising: (i-1) a set of possible targets that might possibly be focused by the person including the ambient targets represented by the ambient data, and (i-2) an additional state that represents a situation where currently no ambient target is focused by the person. The Hidden Markov Model further comprises (ii) an emission space comprising a set of possible directional measurements including the directional measurements represented by the directional sensor data.

A "Hidden Markov Model" (HMM) as such is a known stochastic process used to model randomly changing systems, which process is based on a statistical Markov model in which the system being modeled is assumed to be a Markov Process with unobservable (i.e. hidden) states. A Markov Process is a stochastic model describing a sequence of possible events in which the probability of each event depends only on the state attained in the previous event. This assumption enables reasoning and computation with the model that would otherwise be intractable. A detailed introduction to the topic of Hidden Markov Models may for example be found in RAMAGE, D., *Hidden Markov Models Fundamentals*, Stanford University, CS229 Section Notes, Dec. 1, 2007 (http://cs229.stanford.edu/section/cs229-hmm.pdf).

It has been found that among other available possibilities for performing a matching of directional sensor data and ambient data in the given context of identifying an object of interest of a specific person based on that person's detected behavior, using specifically an HMM as a basis for the sensor fusion model is a particularly suitable approach in view of the above objective of providing a robust and statistically reliable solution.

According to some embodiments, the method further comprises for each point in time of the first time-sequence, partitioning the hidden state space into the classes of observable and unobservable targets according to a predefined observability criterion, wherein only the targets in the class of observable targets are considered as possible targets for the matching of the directional sensor data to the targets represented by the ambient data to generate the third time sequence of data items. In many situations, this significantly reduces the number of ambient targets to be considered in the matching process and the subsequent classification process of the method of the first aspect. This in turn is advantageous in that it helps to reduce the complexity of the model and of said processes and thus to increase the achievable reliability and efficiency of the method.

It is noted that the two terms "unobservable" and "hidden", as used herein, must not be confused. While an ambient target is categorized as "unobservable" at a given point in time, if at that point in time the person in question cannot see it, e.g. if it is not present at all in the person's current field of sight or if it is obstructed by another object, all of the ambient targets, be they observable or unobservable, are "hidden" states in the mathematical framework of the Hidden Markov Model.

Specifically, according to some embodiments, according to the observability criterion a target is classified for the respective point in time as being observable, when one or more of the following conditions are met: (i) the target is located within the current estimated field of sight of the person and closer to the person than a predefined global or target specific distance threshold; (ii) from the point of view of the person, the target is not obstructed or at least not obstructed to a higher degree than a predefined obstruction threshold by any other object; (iii) the target has been consistently classified as being observable during a past time span immediately preceding said point in time, which time span is at least as long as a predefined threshold timespan. Specifically, that threshold timespan may be a parameter that depends on one or more other parameters, such as a speed and/or direction of motion of the person relative to the target in question, for example, when the person sits in a moving vehicle and the target is a building in the external environment of the vehicle. All of the above variants (i) to (iii) for defining the observability criterion are particularly suitable choices in scenarios, where the method is used to identify a specific ambient target among a plurality of available ambient targets in the person's field of sight and with a very high accuracy and reliability.

According to some embodiments, the Hidden Markov Model defines respective transition probabilities for the transitions between the two ambient targets of each pair of ambient targets in the hidden state space, which transition probabilities are defined as a function of one or more of: (i) one or more characteristics of the two ambient targets of the respective transition; (ii) an expected behavior of the person in regard to how often the person tends to change the focus of its attention among different ambient targets; (iii) the mutual distances between the person or a structure in or on which the person is located and each of the two ambient targets of the respective transition; (iv) the mutual distance between the two ambient targets of the respective transition; (v) a current speed or velocity of the person relative to at least one of the two ambient targets of the respective transition. Defining the transition probabilities between the hidden states of the HMM, i.e. the ambient targets, according to one or more of the above variants may be used to further increase the accuracy and reliability of the method of the first aspect and thus the determination of the intended object of interest to the person in question among multiple available ambient targets.

According to some embodiments the ambient data items each further represent at least one or a combination of at least two of the following information items: (i) a global pose, i.e. position and/or orientation, of the person or of a structure, e.g. vehicle, on or in which the person is located at the respective point in time to which the ambient data item relates; (ii) the respective shapes of the one or more ambient targets represented by the respective ambient data item; (iii) the respective global poses of the one or more ambient targets represented by the respective ambient data item; (iv) for each of the one or more ambient targets represented by the respective ambient data item a respective unique individual identifier. In addition, the matching of the directional sensor data to the possible targets represented by the ambient data is further based on said at least one or said combination of at least two of the above information items.

Herein, a global pose of a person, structure or ambient target is its position and/or orientation in global space, e.g. expressed in a global coordinate system such as world coordinates, and may for example be obtained by means of a satellite navigation system such as the Global Positioning System (GPS), Galileo etc., a compass, and one or more inertial sensors. The shape of an ambient target may in be particular be provided as a suitable geometric approximation of the ambient target, such as a bounding rectangle or sphere. Depending on the exact implementation and context, the shape may be selected to be a constant property of the object serving as ambient target (rather than a property varying over time) or may be time-dependent and thus be repeatedly determined. The unique identifier may particularly be assigned to a respective ambient target in such a way that, on the one hand, any currently observable ambient target that has not been previously assigned a unique identifier is being assigned such a unique identifier, which is different from the respective unique identifiers of the other ambient targets. On the other hand, those currently observable targets that were already previously assigned a respective unique identifier simply keep it.

Each of the above-described embodiments of the ambient data items, and each of the various possible combinations of these embodiments, may be advantageously used to further increase the accuracy and reliability of the method of the first aspect. Specifically, they may be used to treat scenarios, where there are many ambient targets in the field of sight of the person and correctly determining the correct intended target as an object of interest to the person. The use of unique identifiers provides a simple and very reliable way of tracking an ambient target over time, in particular if there is a relative motion between the person and that ambient target.

According to some embodiments, the directional data items are defined such that they represent each of the respective related one or more directional measurements by means of an individual measurement identifier and a measurement value per directional measurement. Specifically, such a pair of individual measurement identifier and a measurement value may be denoted as "named directional measurement". The individual measurement identifier may particularly indicate the kind of measurement that is used for the related directional measurement, e.g. whether it is a measurement of a finger pointing direction or of a nodding motion etc. In this way, in the subsequent matching process, the specifics of each kind of measurement may be considered in the sensor fusion process based on the identification of such different kinds of measurements, as indicated by the measurement identifiers occurring for a currently available set of different measurement results as represented by the directional sensor data.

According to some embodiments, generating the directional sensor data comprises: (i) determining one or more of the following aspects of the detected behavior of the person: (i-1) Gaze direction; (i-2) Head orientation; (i-3) a free-space gesture comprising a body motion that expresses a particular direction, e.g. free-space finger pointing or nodding in a particular direction; (i-4) spoken or other acoustic utterances expressing a directional information; and (ii) deriving a direction from the thus-determined one or more aspects of the behavior of the person. Thus, a number of different directional aspects of the possible behavior of the person can be used by the method in order to determine based thereon a particular focused ambient target as the object of interest to the person. Specifically, using the sensor fusion model a plurality of such aspects of the detected behavior of the person may be used as a basis for generating the directional sensor data. This allows for a broad variety of possible information to be included in the directional sensor data and for increasing the accuracy and robustness and thus reliability of the method.

According to some embodiments, the directional measurements represented by the directional data items are classified into different types of measurements. For each type of measurement, a corresponding measurement type indicator is defined that indicates for this type of measurement at least one of: (i) a focus target affinity value, indicating a value of the probability that, given a ambient target is currently focused by the person, a directional measurement of this measurement type will also determine a focusing of the same ambient target; (ii) an emission probability model, EPM(M), indicating a probability distribution (PEM) of the direction indicated by the directional measurement, given an ambient target is currently focused by the person and given that the directional measurement of this measurement type also determines a focusing of the same ambient target. Furthermore, the classifying of said one or more of the ambient targets is performed based on one or more of said measurement type indicators. The measurement type indicator may particularly be defined as a constant data set. Specifically, the focus target affinity value may be defined as a probability value $a \in [0;1]$.

The directional sensor data may be based on multiple measurements of different characteristics. For example, a finger-pointing direction, while the person is pointing at a specific object, is typically quite steady, but not very precise. The gaze direction, in contrast, when the person visually focuses the ambient target, is typically very precise. However, in some scenarios, such as driving-in-traffic scenarios, it is not steady, as the gaze then typically jumps back and forth between the ambient target and the traffic ahead, in order to remain aware of the traffic while also watching the ambient target. Actually, these jumps of gaze direction can have a rather high frequency, as has been observed in actual tests. Thus, the measurement type indicators may be advantageously used to model the overall accuracy as well as certain specific biases of the directional measurement results per measurement type and may thus form the basis of determining and potentially increasing the overall accuracy and reliability of the method.

According to some embodiments, at least one of the first and second time sequences is generated as a discrete-timestep sequence of the ambient data items or the directional data items, respectively, with a fixed timestep length per time sequence. In some of these embodiments, the first and the second time sequences specifically share a same fixed timestep length and may moreover be synchronized such that each ambient data item corresponds temporally to a respective directional data item relating to an, at least substantially, same point in time. Particularly, the ambient data item and the corresponding directional data item may both belong to a same "frame" in a sequence of frames, wherein each frame comprises a related ambient data item its corresponding directional data item and neighboring frames are separated from each other by a constant time step being the same for all steps. The use of discrete-timestep sequences with a fixed timestep length allows for a simple implementation of the method and in particular a simple and reliable pairing of ambient data items with corresponding directional data items to be matched therewith. These effects are even enhanced, when the two time-sequences are synchronized based on a same timestep length.

According to some embodiments, the classifying of said one or more of the ambient targets is based on a focus duration parameter defining a minimal timespan that according to the third time sequence the person must have continuously focused a given ambient target, before that ambient target may be classified as being focused. In this way, a distinction can be made between a detected accidental focusing of an ambient target by the person for only a rather short time and an intended, longer focusing of an ambient target for the purpose of making a conscious selection of that particular ambient target as an object of interest. Accordingly, the accuracy and reliability of the method may thus be further enhanced.

Moreover, in some of these embodiments, the classifying of said one or more of the ambient targets is further based on a minimal focus probability parameter defining a minimum likelihood threshold for the probability that the given ambient target has been continuously focused by the person for a time period being equal or longer than the minimal timespan defined by the focus duration parameter. For example: If the probability that a particular ambient target has been in focus for a duration of at least the defined minimal timespan $t_0>0$ is higher than the minimal focus probability parameter $p_f \in [0;1]$, then the target is classified as being in focus and returned by the method as a result. In this way a very robust classification process may be implemented which further enhances the achievable accuracy and reliability of the method.

According to some embodiments, the method comprises a repetitive process, the process comprising multiple iterations, wherein in each of the iterations a respective ambient data item of the first sequence and a respective directional data item of the second sequence are processed to generate a corresponding result data item of the third sequence. Such an iteration is particularly useful in scenarios, where it is desired to perform an identification of one or more objects of interest repeatedly or even continuously over a longer period of time e.g. in changing environments such as when the person is traveling with a vehicle or is being immersed in a changing augmented or virtual reality.

According to some embodiments, the specific person is located in a vehicle and the method is used to identify, based on the ambient data, an object of interest based on the person's behavior as represented by the directional sensor data. For example, this may be used to identify objects of interest of the person which are located inside the vehicle, such as an element of a human-machine-interface, HMI, of the vehicle itself, or to identify objects of interest in the external environment of the vehicle, such as passing buildings, signs or other vehicles. To illustrate this, one can imagine an exemplary scenario, where the person drives by a cinema while sitting in its car. The person finger-points to the cinema building and utters the question "Which movie will be presented at this cinema tonight at eight o'clock?". The finger-pointing gesture and the utterance can be detected by sensors and transformed into respective directional sensor data to be processed by means of the method, along with ambient data representing the cinema building.

A second aspect of the present invention is directed to an apparatus for identifying an object of interest of a person based on that person's detectable behavior, the apparatus being configured to perform the method of the first aspect of the invention.

Specifically, according to some embodiments, the apparatus is adapted to provide a human-machine-interface, HMI, for use by the person, wherein the HMI is configured as at least one of the following: (i) an automotive HMI configured to enable an interaction of a driver or passenger of a vehicle with the vehicle in relation to objects outside of the vehicle; (ii) a touchless HMI configured to enable a user to select or interact with an object in a monitored technical environment, e.g. in a medical operation room or in a manufacturing environment where the person's behavior is detected to derive therefrom control commands for an apparatus forming a part of the technical environment; (iii) an HMI configured to enable a user to select or interact with an object in a virtual reality application.

A third aspect of the present invention is directed to a computer program comprising instructions, which when executed on an apparatus, particularly on an apparatus according to the second aspect of the present invention, having one or more processors, cause the apparatus to perform the method of the first aspect of the present invention.

The computer program product may in particular be implemented in the form of a data carrier on which one or more programs for performing the method are stored. Preferably, this is a data carrier, such as a CD, a DVD or a flash memory module. This may be advantageous, if the computer program product is meant to be traded as an individual product in individual product independent from the processor platform on which the one or more programs are to be executed. In another implementation, the computer program product is provided as a file on a data processing unit, in particular on a server, and can be downloaded via a data connection, e.g. the Internet or a dedicated data connection, such as a proprietary or local area network.

The apparatus may accordingly have a program memory in which the computer program is stored. Alternatively, the apparatus may also be set up to access a computer program available externally, for example on one or more servers or other data processing units, via a communication link, in particular to exchange with it data used during the course of the execution of the computer program or representing outputs of the computer program.

Figure 2:
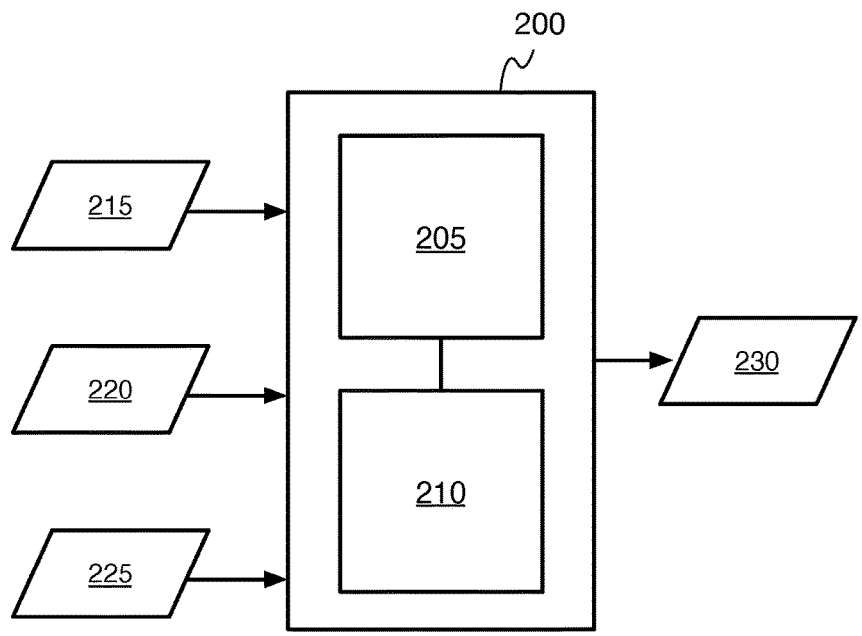
Figure 3:
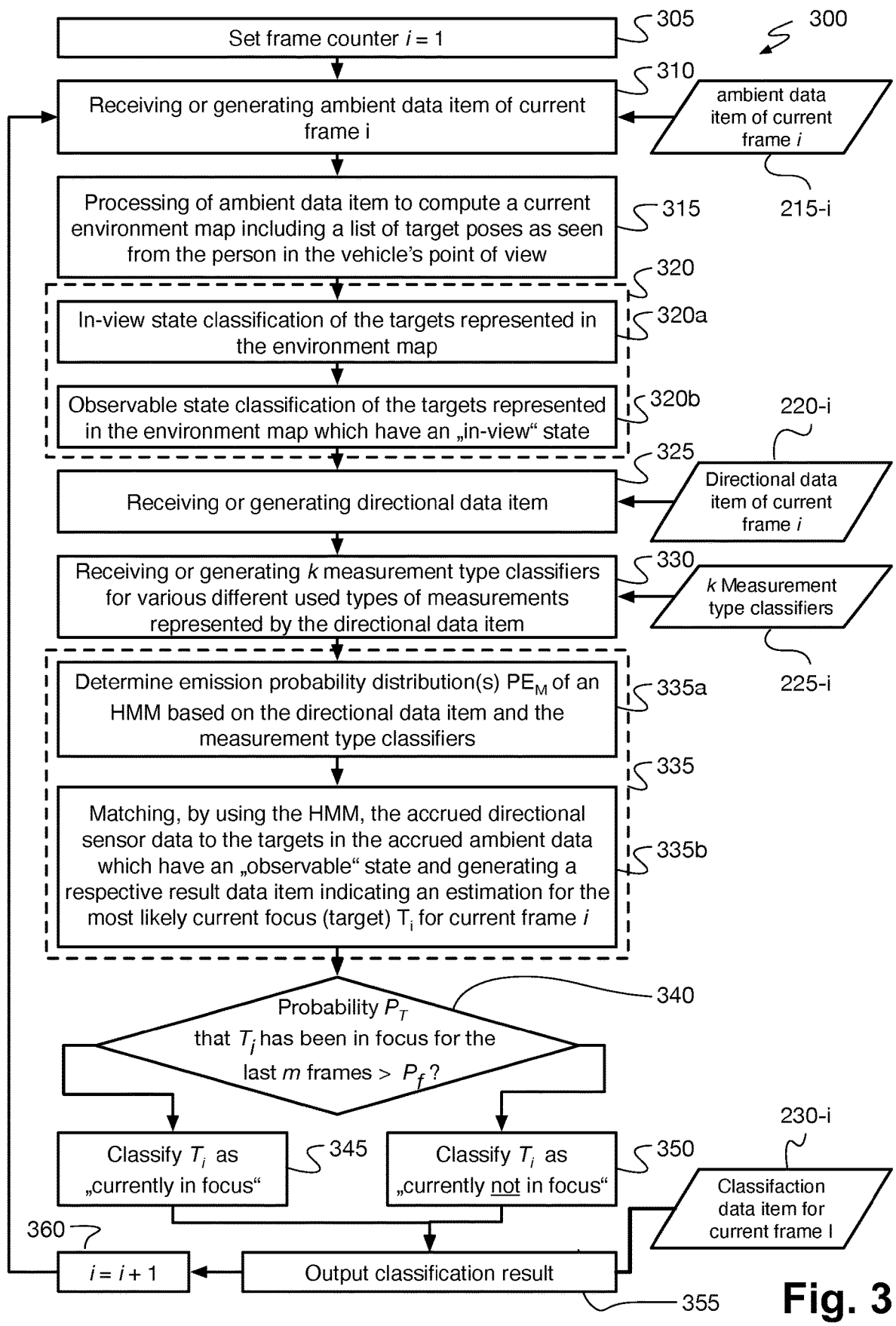
Figure 4:
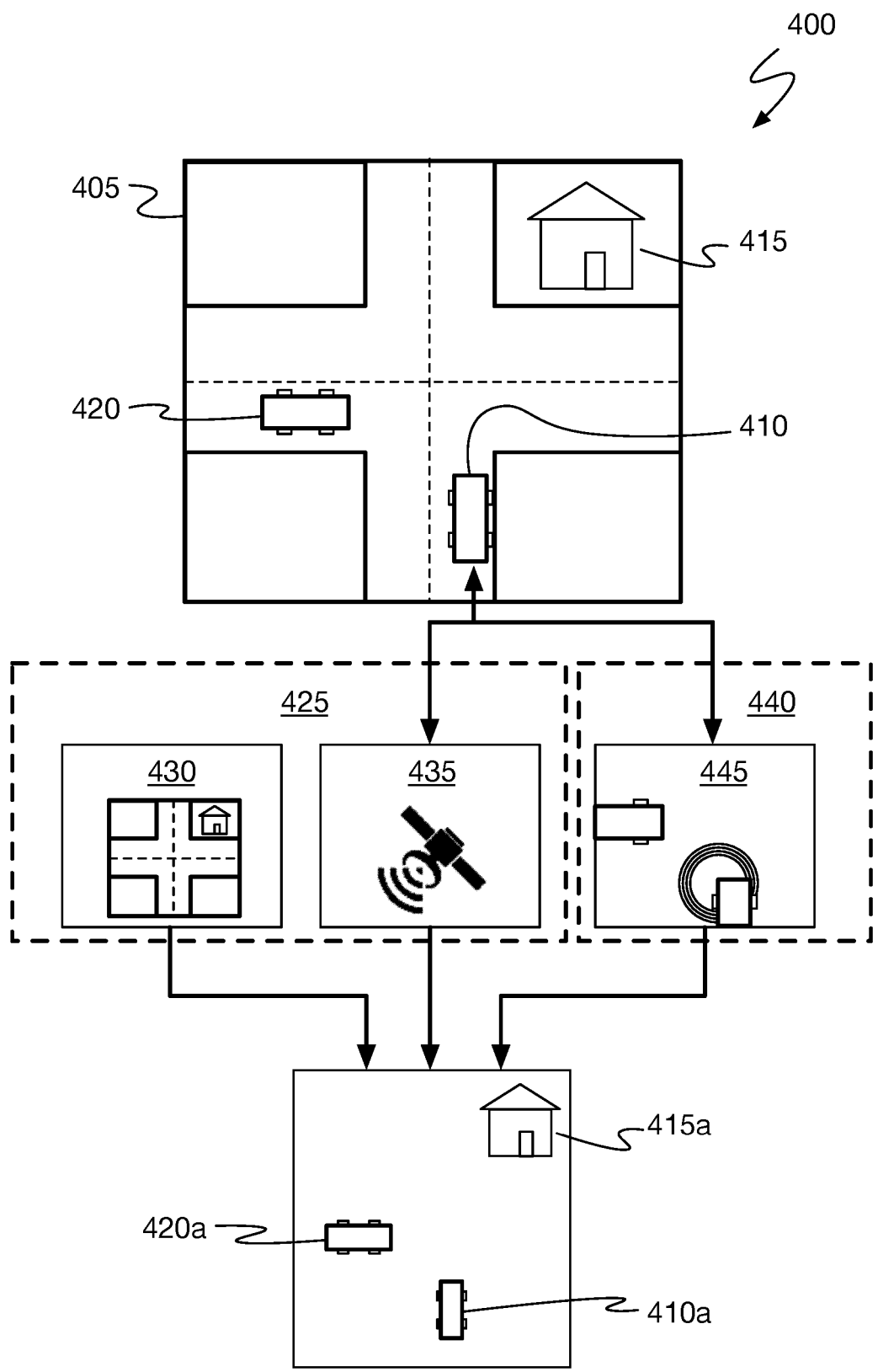
Figure 5:
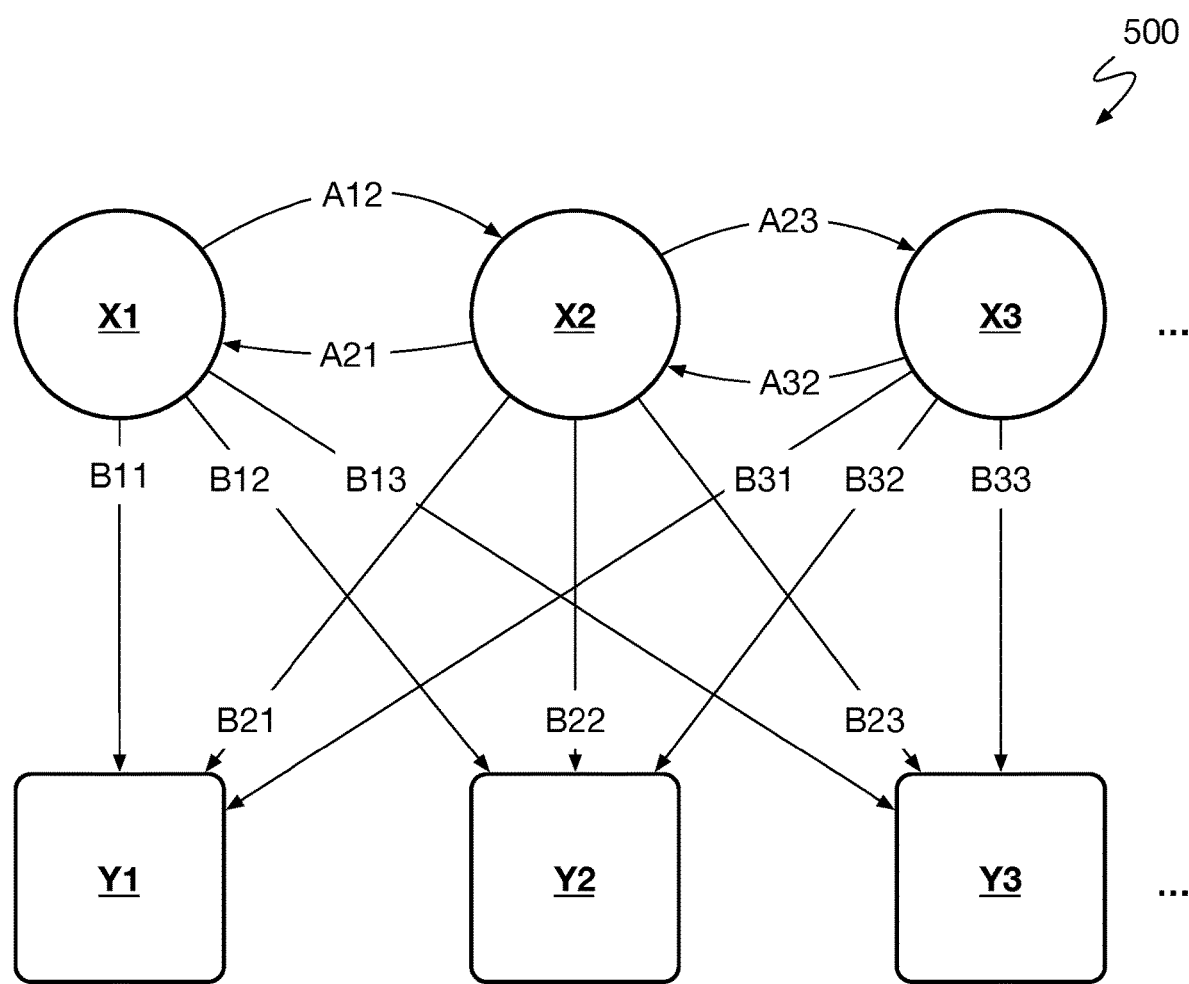

The various embodiments and advantages described above in connection with the first aspect of the present invention similarly apply to the other aspects of the invention. Further advantages, features and applications of the present invention are provided in the following detailed description and the appended figures, wherein:

FIG. 1 schematically illustrates an exemplary application scenario (use case), in which the invention may be used, where the person, for which an object of interest is to be identified, is a driver of a vehicle;

FIG. 2 schematically illustrates an exemplary apparatus for identifying an object of interest of a person, according to an embodiment of the present invention;

FIG. 3 is a flow chart illustrating an exemplary method for identifying an object of interest of a person, according to an embodiment of the present invention;

FIG. 4 is an exemplary top-level illustration of an environment processing step for processing ambient data, which step may be used for example in the method of FIG. 3; and FIG. 5 is an exemplary illustration of an exemplary Hidden Markov Model, HMM, which may be used in the method of FIG. 3 as a sensor fusion model for matching ambient data with directional sensor data to determine a focused target (hidden state).

In the exemplary scenario illustrated in FIG. 1, a person P, for whom an object of interest is to be identified, is a driver of a vehicle 105 and is thus located on the driver's seat of vehicle 105. In the environment of vehicle 105, there are a number of different ambient targets 110, 115 and 120. By way of example, ambient target 110 might be a building, ambient target 115 might be a sign, e.g. a traffic sign, and ambient target 120 might be a restaurant. From the point of view of person P, target 115 is currently obstructed by target 110 and thus not visible (i.e. not observable), although it would be in the field of sight of person P if it was not obstructed by target 110.

The position and orientation of the head, arms and fingers of person P may be detected by means of one or more sensors, e.g. cameras. The thus-generated sensor data may be processed to determine, whether person P currently performs a pointing gesture, such as finger-pointing into a specific pointing direction 130. Furthermore, the direction of gaze 125 of person P's view may also be detected based on the position and orientation of the head and the eyes' orientation relative thereto by means of these or other one or more sensors. The direction of gaze 125 and the direction of pointing 120 may or may not fall together. Generally, they are different. Each of the measurements of the direction of pointing 120 and the direction of gaze 125 has a related uncertainty, which is illustrated in FIG. 1 by means of respective angular limitation lines 125a, b and 130a, b respectively.

Any one of ambient targets 110, 115 and 120 may in principle become an object of interest of person P, which object of interest needs to be properly identified. For example, if target 110 is focused by person P by means of one or more of finger-pointing and gazing at target 110 and is thus selected as an object of interest, a further speech input expressed by person P, e.g. asking a question, such as "how tall?" or "address?", will be interpreted by a respective human machine interface, HMI, of the vehicle 105 as relating to target 110. In this example, the HMI may belong to an electronic personal assistant solution providing automatic answers to questions being input over the HMI.

Referring now to FIG. 2, the method of the present invention may be performed by an exemplary apparatus 200 for identifying an object of interest of a person P. Specifically, apparatus 200 may be or comprise a processing unit comprising a processor 205 and a memory 210 connected thereto. The memory may contain a computer program comprising one or more program modules, the computer program being configured to cause apparatus 200, in particular its processor 205, to perform the method of the present invention, for example according to the embodiment 300 presented in FIG. 3.

When performing the method, apparatus 200 receives, or generates itself, particularly by means of respective one or more sensors, ambient data 215, directional sensor data 220, and measurement type indicators 225 that identify the type of directional measurements used to generate the directional sensor data 220 as inputs and provides classification data 230 identifying the determined object (target) of interest, if any, as an output, as will be discussed in more detail below with reference to FIG. 3.

Exemplary method 300, which will now be described with reference to FIG. 3 and further reference to the examples provided in other figures, is structured as an iterative process comprising a loop, wherein each iteration (i.e. run through the loop) corresponds to a related specific point in time in a time series of determinations of an object of interest. Each iteration comprises processing ambient data and directional data relating specifically to that point in time. Collectively, the input data relating to such point in time is referred to herein as a "frame" in analogy to an image frame of a video signal. In fact, the input data may be provided as a video signal, in particular when the one or more sensors generating the input data comprise at least one camera.

In the present example, the method comprises an initial step 305 in which a frame counter i is initially set, for example to i=1. The frame counter i serves as an index for the respective frames and thus iterations or points in time. The time step between each two consecutive frames i and i+1 may particularly be a constant.

In a further step 310, an ambient data item 215-$i$ relating to the current frame i is being received or generated. More specifically, the ambient data item 215-$i$ represents for the specific point in time corresponding to the current frame i one or more ambient targets being currently present in the spatial environment of the person P. In the example of FIG. 1, these ambient targets would be targets 110, 115 and 120.

Ambient data item 215-$i$ may specifically indicate a vehicle pose characterizing the position and orientation of the vehicle 105 in global space. This information might have been obtained, for example, by means of a satellite navigation system, such as GPS, an internal compass and inertial sensors of the vehicle. In addition, ambient data item 215-$i$ may comprise a list of all currently present ambient targets 110, 115 and 120 in the environment of vehicle 105 and more specifically, for each such target a unique individual identifier. Preferably, each of these individual identifiers is globally unique, which is particularly useful for targets being represented in map data, e.g. buildings, restaurants, cinemas, zoos, etc. Specifically, one way of signing the unique individual identifiers is to assign such an individual identifier when a particular target occurs for the first time in the given frame i but has not been in the previous frame i−1. If then the same possible target reappears in the next frame i+1 as a target, it is required to have the same unique individual identifier. Accordingly, the method may comprise a corresponding target matching step to be accomplished by a preprocessing the ambient data item 215-$i$.

In addition, ambient data item 215-$i$ may comprise, preferably as part of the list, for each possible target an indication of the shape of the target in the form of a suitable geometric approximation of the target, such as a bounding rectangle or a bounding sphere. Depending on the exact implementation and context (e.g. for static targets), that shape may be a constant property of target (object) rather than varying per-frame, in which case it would preferably not be treated as a per frame but rather as a global input to the method. Moreover, ambient data item 215-$i$ may indicate for each of its listed targets a respective global pose of that target, i.e. a current position and orientation of the target's shape. Again, in a static case, the global pose of the target may be a constant property thereof, for example in the case of a static building or other static infrastructure, the pose of which is constant over time.

The method 300 continues with an environment processing step 315, in which the ambient data item 215-$i$ is being processed to compute a current environment map including said list of unique individual target identifiers and target poses as seen from the person P's perspective and any other related information provided in the ambient data item 215-$i$.

FIG. 4 illustrates an exemplary top-level view of environment processing step 315. In this example, reference sign 405 relates to a real-world environment of vehicle 410. Person P is located in this vehicle 410, e.g. as a driver or other passenger, similar to the situation shown in FIG. 1 for vehicle 105. In addition to vehicle 410, a building 415 and another vehicle 420 are each present in the ambient environment of vehicle 410. The ambient data 215 including ambient data items **215-*i* for respective frames i (cf. FIGS. 2 and 3) is generated from three different sources in both a static target evaluation 425 and a dynamic target evaluation 440**.

Static target evaluation 425 comprises determining a static map of the environment 405 and generating static map data 430 representing that map. In the given example, the map reflects the static infrastructure provided by a crossing of two streets and static building 415. Furthermore, static target evaluation 425 comprises determining a global pose of vehicle 410, i.e. its current position and orientation, and generating vehicle pose data 430 representing that vehicle pose. Generating the vehicle pose data 430 may particular be performed based on position data 435 from a satellite navigation system and sensor data from internal sensors of the vehicle 410, such as a compass and one or more inertial sensors.

Dynamic target evaluation 440 comprises using exterior sensors, e.g. sensors being arranged in or on the vehicle 410, to detect to detect varying, i.e. dynamic, exterior targets in the ambient environment of vehicle 410. In the present example, moving vehicle 420 is such a dynamic target and can be sensed by means of said exterior sensors.

Environment processing step 315 further comprises consolidating the static map data 430, the vehicle pose data 435 and the exterior sensor data 445 into one overall model of the ambient environment of vehicle 410. In this ambient environment model, vehicle 410 is represented by vehicle model 410a, the second vehicle 420 is represented by a second vehicle model 420a, and building 415 is represented by building model 415a, all of which models are represented in the ambient data, in particular of the ambient data item **215-*i*** of the current frame i.

Referring now again to FIG. 3, method 300 further comprises a model updating process 320, which in turn comprises a first processing step 320a, in which the targets being represented in the current environment map are being classified as being currently either "in view" or "not in view" from the person P's perspective. Herein, the target is classified as "in view", if it is currently potentially visible to the person and as "not in view", if it is currently not visible, for example if it is obstructed by another object. Specifically, a target may be classified as being "in view", if it is in a reasonably forward direction from the person P, reasonably close to it, and not obstructed by a different target. Accordingly, in the example FIG. 1, possible targets 110 and 120 would be classified as being "in view", while target 115, which is obstructed by target 110, would thus be classified as "not in view". In the example of FIG. 4, building 415 and vehicle 420 have both been recognized in the environment processing step 315 as ambient targets and thus are both represented in the environment map. It is assumed here that both ambient targets 415 and 420 in FIG. 4 are classified as "in view".

Model updating process 320 further comprises a second processing step 320b, the targets being represented in the environment map and having an "in-view" state are further classified either as an "observable" target or an "unobservable" target or state. In this way, making reference to a Hidden Markov model being used as part of method 300, the hidden state space representing the various targets is partitioned at any time into the classes of observable and unobservable targets (hidden states), respectively. Generally, the target should be classified according to a respective observability criterion, as being "observable", if it is or recently has been visible to the person P so that person P may potentially currently focus the target, e.g. by gazing at it or pointing at it. Specifically, the observability criterion may be defined such that a target is classified as being "observable" to person P, if it has been in the estimated field of view of person P at least once within a fixed time of length m. Here, the parameter m is a constant, which may be referred to as a memory span.

In one specific non-limiting example, such a classification can be achieved by defining that the target is classified as being "observable", if one of the following two condition holds (observability criterion):

(1) The target is located within the current (estimated) field of view of person P and closer than a fixed distance threshold (which may depend on the target size as represented by it shape information). The target can be visually perceived by person P. Moreover, if it is reasonably possible (e.g. the underlying map is detailed enough to provide some knowledge of potential obstructions), the condition may be refined by requiring that the target may not be obstructed by other obstacles;

(2) The target has been observable in the sense of condition (1) at any point during a predefined past time span $t_m$, wherein $t_m$ is a threshold time (e.g. 1 to 3 seconds, preferably around 2 seconds). This is to account for the possibility that a target may be temporarily obstructed by obstacles or be otherwise outside of person P's field of view, but then reappears and remains in the person P's focus. The threshold time $t_m$ may be defined depending on parameters such as the speed of the vehicle, the number of currently visible targets etc. to model expected human memory capabilities.

In a further step 325, a directional data item **220-*i* relating to the current frame i is being received or generated. The directional data item 220-*i* represents for the specific point in time corresponding to the current frame i one or more directional measurements of the person P's behavior as detected by a suitable HMI of vehicle 410 or by apparatus 200** itself.

The directional data item **220-*i* may be defined such that it represents one or more directional measurements by means of a respective individual measurement identifier and a respective measurement value per such directional measurement. For example, directional data item 215-*i* might relate to two different directional measurements, one being a measurement of the gaze direction 125 of person P and the other one being a measurement of a finger-pointing direction 130 of person P, as illustrated in FIG. 1**. A respective individual measurement identifier, e.g. a name for the respective measurement such as "gaze" or "finger", may thus be assigned to each of these two measurements in order to be able to easily distinguish them and relate them to a measurement type.

In addition, in a step 330, which may also be combined with step 325 to form a combined single step, a number of measurement type indicators **225-*i* are received or generated, wherein each of those measurement type indicators 225-*i* indicates a respective type of measurement of a corresponding measurement represented by the directional data item 220-*i*. Accordingly, in the present example, if directional data item 220-*i* represents k different measurements, then there is an equal number k of measurement time indicators 225-*i***.

For each type of measurement, the corresponding measurement type indicator **225-*i*.** is defined such that it indicates for this type of measurement a focus target affinity value and an emission probability model EPM(M) for a related HMM. The focus target affinity value a(M) is a value indicating the probability that, given an ambient target is currently focused by the person P, a directional measurement of this measurement type M will also determine a focusing of the same ambient target. Specifically, the focus target affinity value a(M) may be defined as a probability value a(M)∈ [0;1].

The emission probability model EPM(M) indicates a probability distribution PEM of the direction indicated by the directional measurement, given an ambient target is currently focused by the person P and given that the directional measurement of this measurement type M also determines a focusing of the same ambient target.

Method 300 continues with a state updating process 335 which comprises, in particular, a first processing step 335a, in which an emission probability distribution of an HMM is determined based on the information in the directional data item 220-i and the related measurement type indicators 225-i. In the present example, where there are k measurement types $M_1, \ldots, M_k$, the term EPM(M)= $PE_{M1} \times \ldots \times PEM_k$, provides an emission probability distribution EPM(M) of the HMM (assuming there is no correlation between different measurement types).

State updating process 335 further comprises a second processing step 335b, in which the Hidden Markov Model (HMM) is used to match the accrued directional sensor data to the targets in the ambient data that have an "observable" state. The matching, which may also be interpreted as a sensor fusion process using the HMM as sensor fusion model, is based in particular on the emission probability distribution EPM(M) that was determined in step 335a and which serves as a set of parameters of the HMM. In addition, the matching may optionally be based on the focus target affinity value a(M), e. g. as illustrated in method 300.

The result, which is represented by a respective result data item for frame i, indicates an estimation for the most likely current focus, i.e. target $T_i$ in focus, for the current frame i.

In a further step 340, the probability that the target $T_i$ has been in focus for the last m frames is calculated and compared to a predefined threshold value $P_f$. If $T_i$ is greater than $P_f$ (i.e. $T_i > P_f$), target $T_i$ is classified in a further step 345 as being "currently in focus", else it is classified in a step 350 as being "currently not in focus", the latter being equivalent to no target being in focus in frame i. Accordingly, the parameter m is a predefined threshold value, which may be used to determine, how long a particular target has to have been focused by person P, before it might be classified as being "currently in focus".

Finally, in a step 355 the classification result is output in the form of a classification data item 230-i for the current frame i and in a further step 355 the frame counter i is incremented. Then method 300 loops back for another iteration to step 310 for beginning the processing of the next frame. A simple example for calculating the focus probability relating to the exemplary top-level illustration of an environment processing 400 in FIG. 4 is provided below. All the following values are exemplary and serve an explanatory function and are by no means intended to limit the scope of the present invention. In this example, only detecting finger pointing and gaze are considered as directional measurements (while no head pose detection or other measurements are considered). For the sake of simplicity, the entire example uses 2D coordinates for positions, assuming that the environment is perfectly flat. Real systems would usually work in a 3D space. Assume the system is operating with measurements at discrete timesteps at intervals of 100 ms (i.e., 10 frames/sec).

At a specific point in time n, the ambient input yields two observable targets: A target named "vehicle" 420 at position (−5; 3) and a target named "house" 415 at position (4;10) (the numbers describe the positions in meters in the vehicle 410 coordinate system. Thus, the hidden state space in the sense of the Markov model currently consists of 3 states: "Focus on house 415" (S1), "Focus on vehicle 420" (S2) and "no focus" (S3).

The transition probabilities may be given by: P(S1→S1)=95%, P(S1→S2)=0, P(S1→S3)=5%, P(S2→S1)=0, P(S2→S2)=90%, P(S2→S3)=10%, P(S3→S1)=6%, P(S3→S2)=4%, P(S3→S3)=90%.

These numbers are modeled and might for example be the outcome of an experimental research on human behavior, reflecting the following hypothetical and exemplary observations: The average focus time for a building (i.e., rather large, static target) is 2 seconds (i.e., 20 frames given the framerate of the system). Therefore, in an individual frame where the target is in focus, the probability that a focus transition away from the house happens after that frame is modeled to be at 5%. The average focus time for a vehicle is 1 second (i.e. 10 frames). Therefore, the probability that a focus transition happens in an individual frame is modelled to be at 10%. It is observed that drivers never focus different targets directly after one another, i.e., there is always a no focus event in between. Hence, the transition probabilities for the transitions house→vehicle and vehicle→house are modelled to be each at 0%. It is observed that a "no focus" period lasts on average 10 seconds (100 frames). Furthermore, 60% of all focused targets are static.

In this 2D example, a direction (such as gaze or pointing direction) may be parametrized by a single number, namely an angle. Specifically, here a direction is represented by its angle with the y-axis (forward axis in vehicle coordinates). Thus, a measured angle of 0° represents a forward-directed (gaze or pointing) measurement, 90° represents a direction to the left, and correspondingly, −90° a right direction.

Mathematically, this means that the angle representing a direction from the driver (the origin in vehicle 410 coordinates) to a point at position (x,y) is given by −a tan(x/y). While this formula generates angles in radians, they will be expressed in degrees here for comprehensibility. In particular, we assume that all directions that will be measured will be within the range [−90°,90°].

A simplified example of how to model emission probabilities (i.e., a distribution of expected direction measurements, given each respective state of the model) is given. This is done separately for gaze and pointing direction:

The target building 415 with position (4,10) is considered, and $$\alpha_T = -a\tan\left(\frac{4}{10}\right) \approx -21.8°$$

is the direction towards the target building 415. Since the pointing direction is usually not very precise, the assumption in this model that an (intended) pointing towards the target might actually have an expected deviation from the target direction of 10° (cf. angular limits of pointing range 130a, 130b), might be made.

Therefore the pointing emission probability of the pointing direction is modeled by a Gaussian distribution with standard deviation of 10° around $\alpha_T$:

$$PE_{pointing}(x|T \text{ in focus}) = N(x, \alpha_T, 10°)$$

where $$N(x, \mu, \sigma) = \frac{1}{\sqrt{2\pi}\sigma} e^{-\frac{(x-\mu)^2}{2\sigma^2}}$$

denotes the Gaussian function with mean μ and standard deviation σ.

The gaze direction 125 (when looking at a target) is usually much more accurate than the pointing direction 130. However, observations show that even when a driver is consciously focusing a target, their gaze jumps back and forth between the target and the road ahead. This may be accounted for by an output distribution that is the (weighted) sum of two distributions:

$$PE_{gaze}(x \mid T \text{ in focus}) = \frac{1}{2}(N(x, \alpha_T, 2°) + N(x, 0, 10°))$$

The assumption is made that the driver either focuses the traffic ahead or the target, with equal probabilities of 50% each. The first summand models the case where the gaze is directed towards the target (with very high accuracy), and the second summand covers the case where the driver looks ahead (towards the traffic). The emission probabilities used in this example treats all targets as points and do not take their sizes into account. A real model would usually be more sophisticated in this respect.

The probabilities of the different hidden states (the respective objects being in focus) depend on the measured data, and also recursively on the probabilities computed in the previous evaluation step (the previous frame). In this example, assume that, at the given time point, these a priori focus probabilities $P_n$ are given by:

$P_n$ ("focus on house 415")=9%, $P_n$ ("focus on vehicle 420")=1%, and $P_n$ ("no focus")=90%. It is now assumed that the measurements in the current frame are 0° as the gaze angle 125 and −20° as the pointing angle 130. Now, the emission probability model yields the following emission probabilities:

The expected probability of the pointing measurement given that the house 415 is in focus:

$PE_{pointing}(-20°|\text{house 415 in focus})=N(-20°,-21.8°, 10°)\approx 0.95$

The expected probability of the gaze measurement given that the house 415 is in focus:

$PE_{gaze}(0° \mid \text{house 415 in focus}) =$ $$\frac{1}{2}(N(0°, -21, 8°, 2°) + N(0°, 0°, 10°)) \approx \frac{1}{2}(0.27 + 0.95)) = 0.61$$

The expected probability of the pointing measurement given that the vehicle 420 is in focus:

$PE_{pointing}(-20°|\text{vehicle 420 in focus})=N(-20°,-59.04°,10°)\approx 0.004$ The expected probability of the pointing measurement given that the vehicle 420 is in focus:

$PE_{pointing}(0° \mid \text{vehicle 420 in focus}) =$ $$\frac{1}{2}(N(0°, 59.04°, 2°) + N(0°, 0°, 10°)) \approx \frac{1}{2}(0.0000006 + 0.95)) = 0.48.$$

While in this example, the gaze measurement does not provide much information (due to the fact that the gaze show towards the road, which is a likely possibility in every case), the pointing measurement is a very clear indicator that the house 415 is the focus target. For the sake of this simple example, the probability that "no focus" is the currently active hidden state may be further modeled to be at 0° whenever pointing is measured.

It is now assumed that the gaze direction 125 and the pointing directions 130 are uncorrelated. Therefore, the overall emission probabilities are obtained as the product of probabilities of the individual measurements:

$PE((-20°,0°|\text{house 415 in focus})\approx 0.94\cdot 0.61\approx 0.58)$ $PE((-20°,0°|\text{vehicle 420 in focus})\approx 0.48\cdot 0.004\approx 0.002$ Using these emission probabilities, the new state probabilities $P_{n+1}(\ldots)$ are evaluated using the forward algorithm:

$P_{n+1}(\text{house in focus}) == PE((-20°, 0°) \mid \text{house 415 in focus})\cdot$ $$\sum_{target} (PT(\text{target} \rightarrow \text{house 415})\cdot P_n(\text{target in focus}) =$$

$0.58 \cdot (PT(\text{house 415} \rightarrow \text{house 415})\cdot P_n(\text{house 415 in focus}) +$ $PT(\text{vehicle 420} \rightarrow \text{house 415})\cdot P_n(\text{vehicle 420 in focus}) +$ $PT(\text{no focus} \rightarrow \text{house 415})\cdot P_n(\text{no focus}))$ and analogously for the vehicle. Substituting all the numbers yields $P_{n+1}(\text{house 415 in focus})\sim 0.58\cdot(0.95\cdot 0.09+0\cdot 0.01+ 0.06\cdot 0.9)\approx 0.14$ $P_{n+1}(\text{vehicle 420 in focus})\sim 0.002\cdot(0\cdot 0.09+0.9\cdot 0.01+ 0.04\cdot 0.9)\approx 0.00009$ where in this context "~" means "proportional to". Scaling this accordingly (to 100% in total), the outcome is $P_{n+1}$ (house 415 in focus)≈99.94%, $P_{n+1}$ (vehicle 420 in focus)≈0.06%.

FIG. 5 is an exemplary generic illustration of a Hidden Markov Model (HMM) 500 which may be used in the method of FIG. 3 as a sensor fusion model for matching ambient data with directional sensor data to determine a focused target (hidden state) among a set of possible targets.

The HMM 500 comprises a time sequence of three different states $X_1$, $X_2$ and $X_3$ (and optionally more of such states X) from a defined set of all possible states, each of which represents a target person P might potentially select according to its behavior as an object of interest. HMM 500 further comprises another time sequence of three different states $Y_1$, $Y_2$ and $Y_3$ (and optionally more of such states Y) from a set possible observable states, which in the language of statistics are usually referred to as "emissions". Each state $Y_1$, $Y_2$ and $Y_3$ represents a respective directional measurement of person P's behavior, as described above. These emissions states Y are directly observable, because gaze direction, pointing direction, directional speech input etc. can each be directly detected by respective sensors. The set of possible emissions is sometimes also called "alphabet" of the possible observations.

In contrast, in the framework of the HMM 500, the target states $X_1$, $X_2$ and $X_3$ are hidden states, because they are not directly observable, since the sensors in the vehicle cannot directly detect which target, if any is currently the focus. Rather this information has to be derived from the observable emissions Y by means of the HMM 500.

The HMM 500 is further defined by a matrix of so-called "transition probabilities" $A_i$ which define the probability of a transition from a first state $X_i$ to another state $X_j$ (Here, i is simply an index and is not to be confused with the frame index i of FIG. 3). For example, the parameter $A_{12}$ stands for the probability of a transition from hidden state $X_1$ to hidden state $X_2$.

Furthermore, HMM 500 is defined by an observation matrix $B_{ij}$ having as its matrix elements so-called emission probabilities $B_{ij}$ which define the probability of an observation if the present hidden state is state $X_i$.

Specifically, the transition probabilities $A_{ij}$ may be defined as a function of one or more of: (i) one or more characteristics of the two ambient targets $X_i$ and $X_j$ of the respective transition; (ii) an expected behavior of the person P in regard to how often the person P tends to change the focus of its attention among different ambient targets X; (iii) the mutual distances between the person P or the vehicle 410 and each of the two ambient targets $X_i$ and $X_j$; (iv) the mutual distance between the two ambient targets $X_i$ and $X_j$; (v) a current speed or velocity of the person P or of the vehicle 410 relative to at least one of the two ambient targets $X_i$ and $X_j$. Defining the transition probabilities between the hidden states of the HMM, i.e. the ambient targets, according to one or more of the above variants may be used to further increase the accuracy and reliability of the method 300 and thus the determination of the intended object of interest to the person P among multiple available ambient targets X.

While above at least one exemplary embodiment of the present invention has been described, it has to be noted that a great number of variations thereto exists. Furthermore, it is appreciated that the described exemplary embodiments only illustrate non-limiting examples of how the present invention can be implemented and that it is not intended to limit the scope, the application or the configuration of the herein-described apparatus' and methods. Rather, the preceding description will provide the person skilled in the art with constructions for implementing at least one exemplary embodiment of the invention, wherein it has to be understood that various changes of functionality and the arrangement of the elements of the exemplary embodiment can be made, without deviating from the subject-matter defined by the appended claims and their legal equivalents.

LIST OF REFERENCE SIGNS

P person
100 exemplary scenario, where the person P is a driver of a vehicle
105 vehicle with person P onboard
110 first target
115 second target
120 third target
125 gaze direction
125a, b angular limits of gaze range
130 pointing direction
130a, b angular limits of pointing range
200 apparatus for identifying an object of interest of a person
205 processor
210 memory
215 ambient data
215-i ambient data item of frame i
220 directional sensor data
220-i directional data item of frame i
225 measurement type indicators
225-i measurement type indicators of frame i
230 classification data
230-i classification data item of frame i
300 exemplary method for identifying an object of interest of a person
305-360 steps of method 300
400 exemplary top-level illustration of environment processing
405 real-world environment of vehicle 410
410 vehicle with person P
410a data representation of vehicle 420
415 building
415a target representation of building 415
420 another vehicle
420a target representation of vehicle 420
425 static target evaluation
430 static map data
435 vehicle pose data
440 dynamic target evaluation
445 exterior sensor data
500 parameters of a Hidden Markov Model, HMM
$X_1, \ldots X_3$ hidden states
$Y_1, \ldots Y_3$ emissions
$A_{xy}$ transition probabilities
$B_{xy}$ emission probabilities
i frame counter

The invention claimed is:

1. A method of identifying an object of interest of a person based on that person's detectable behavior, the method comprising:

receiving or generating ambient data representing a first time sequence of ambient data items, each ambient data item representing for a specific respective point in time in the first time sequence one or more ambient targets being currently present as a respective object in the spatial environment of the person at that point in time;

receiving or generating directional sensor data representing a second time sequence of directional data items, each directional data item representing one or more directional measurements relating to a specific point in time in the second time sequence, wherein each of the directional measurements indicates a detected directional aspect of the person's behavior at that point in time;

matching the directional sensor data to possible targets represented by the ambient data to generate a third time sequence of result data items, each result data item representing a matching result indicating whether a directional data item in the directional sensor data indicates a direction pointing to an ambient target being represented by a temporally corresponding ambient data item in the ambient data; and classifying one or more of the ambient targets represented by the ambient data based on at least two of the corresponding result data items of the third time sequence to determine which of these ambient targets, if any, is being focused by the person;

wherein the matching is based on a sensor fusion model configured to determine the most likely focus target in dependence on measurements represented by the first and second time sequences, wherein the matching is based on a sensor fusion model comprising a Hidden Markov Model, HMM, which comprises:

a hidden state space comprising:

a set of ambient targets that may be focused by the person including the ambient targets represented by the ambient data, and an additional state that represents a situation where currently no ambient target is focused by the person; and an emission space comprising a set of possible directional measurements including the directional measurements represented by the directional sensor data.

2. The method of claim 1, further comprising:

for each point in time of the first time sequence, partitioning the hidden state space into the classes of observable targets and unobservable targets according to a predefined observability criterion;

wherein only the targets in the class of observable targets are considered as possible targets for the matching of the directional sensor data to the possible targets represented by the ambient data to generate the third time sequence of data items.

3. The method of claim 2, wherein according to the observability criterion a target is classified for the respective point in time as being observable, when one or more of the following conditions are met:

the target is located within the current estimated field of sight of the person and closer to the person than a predefined global or target specific distance threshold;

from the point of view of the person, the target is not obstructed or at least not obstructed to a higher degree than a predefined obstruction threshold by any other object; and the target has been consistently classified as being observable during a past time span immediately preceding said point in time, which time span is at least as long as a predefined threshold timespan.

4. The method of claim 1, wherein the Hidden Markov Model defines respective transition probabilities for the transitions between the two ambient targets of each pair of ambient targets in the hidden state space, which transition probabilities are defined as a function of one or more of:

one or more characteristics of the two ambient targets of the respective transition;

an expected behavior of the person in regard to how often the person tends to change the focus of its attention among different ambient targets;

the mutual distances between the person or a structure in or on which the person is located and each of the two ambient targets of the respective transition;

the mutual distance between the two ambient targets of the respective transition;

a current speed or velocity of the person relative to at least one of the two ambient targets of the respective transition.

5. The method of claim 1, wherein:

the ambient data items each further represent at least one or a combination of at least two of the following information items:

a global pose of the person or of a structure on or in which the person is located at the respective point in time to which the ambient data item relates;

the respective shapes of the one or more ambient targets represented by the respective ambient data item;

the respective global poses of the one or more ambient targets represented by the respective ambient data item;

for each of the one or more ambient targets represented by the respective ambient data item a respective unique individual identifier; and the matching of the directional sensor data to the possible targets represented by the ambient data is further based on said at least one or said combination of at least two of the above information items.

6. The method of claim 1, wherein the directional data items are defined such that they represent each of the respective related one or more directional measurements by means of an individual measurement identifier and a measurement value per directional measurement.

7. The method of any claim 1, wherein generating the directional sensor data comprises:

determining one or more of the following aspects of the detected behavior of the person:

gaze direction;

head orientation;

a free-space gesture comprising a body motion that expresses a particular direction;

spoken or other acoustic utterances expressing a directional information; and deriving a direction from the thus-determined one or more aspects of the behavior of the person.

8. The method of claim 1, wherein the directional measurements represented by the directional data items are classified into different types of measurements;

for each type of measurement, a corresponding measurement type indicator is defined that indicates for this type of measurement at least one of:

a focus target affinity value, indicating a value of the probability that, given a ambient target is currently focused by the person, a directional measurement of this measurement type will also determine a focusing of the same ambient target; and an emission probability model indicating a probability distribution of the direction indicated by the directional measurement, given a ambient target is currently focused by the person and given that the directional measurement of this measurement type also determines a focusing of the same ambient target; and the classifying of said one or more of the ambient targets is performed based on one or more of said measurement type indicators.

9. The method of claim 1, wherein at least one of the first and second time sequences is generated as a discrete-timestep sequence of the ambient data items or the directional data items, respectively, with a fixed timestep length per time sequence.

10. The method of claim 9, wherein the first and the second time sequences share a same fixed timestep length.

11. The method of claim 1, wherein the classifying of said one or more of the ambient targets is based on a focus duration parameter defining a minimal timespan that according to the third time sequence the person must have continuously focused a given ambient target, before that ambient target may be classified as being focused.

12. The method of claim 11, wherein the classifying of said one or more of the ambient targets is further based on a minimal focus probability parameter defining a minimum likelihood threshold for the probability that the given ambient target has been continuously focused by the person for a time period being equal or longer than the minimal timespan defined by the focus duration parameter.

13. The method of claim 1, the method comprising a repetitive process, the process comprising multiple iterations, wherein in each of the iterations a respective ambient data item of the first sequence and a respective directional data item of the second sequence are processed to generate a corresponding result data item of the third sequence.

14. The method of claim 1, wherein the specific person is located in a vehicle and the method is used to identify, based on the ambient data, an object of interest based on the person's behavior as represented by the directional sensor data.

15. A non-transitory computer-readable medium comprising instructions, which when executed on a computing device having one or more processors, cause the apparatus to perform the method of claim 1.

* * * * *